(12) United States Patent
Gilbert et al.

(10) Patent No.: US 7,917,527 B1
(45) Date of Patent: Mar. 29, 2011

(54) PERSONALIZED DIRECTORY SERVICES FOR WEB ROUTING

(75) Inventors: Mazin Gilbert, Warren, NJ (US); Gerald Karam, Morris Township, Morris County, NJ (US); Karrie Hanson, Westfield, NJ (US); Giuseppe Di Fabbrizio, Florham Park, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 986 days.

(21) Appl. No.: 11/240,664

(22) Filed: Sep. 30, 2005

(51) Int. Cl.
*G06F 7/00* (2006.01)
*G06F 17/30* (2006.01)

(52) U.S. Cl. ........................ 707/766; 707/767

(58) Field of Classification Search .............. 707/101, 707/1, 10, 766, 767, 772, 781; 705/7; 709/224; 715/774; 717/103
See application file for complete search history.

(56) References Cited

U.S. PATENT DOCUMENTS

| | | | |
|---|---|---|---|
| 6,816,850 B2 | 11/2004 | Cullis | |
| 6,915,066 B2 | 7/2005 | Ando | |
| 6,950,821 B2 | 9/2005 | Faybishenko et al. | |
| 7,398,209 B2* | 7/2008 | Kennewick et al. | 704/255 |
| 2002/0103789 A1* | 8/2002 | Turnbull et al. | 707/3 |
| 2002/0188680 A1 | 12/2002 | McCormack et al. | |
| 2003/0154405 A1* | 8/2003 | Harrison | 713/201 |
| 2005/0157753 A1* | 7/2005 | Mayer | 370/468 |
| 2006/0041586 A1* | 2/2006 | Nassef, Jr. | 707/104.1 |

* cited by examiner

*Primary Examiner* — Charles Rones
*Assistant Examiner* — Fariborz Khoshnoodi
(74) *Attorney, Agent, or Firm* — Greenberg Traurig, LLP

(57) ABSTRACT

A system for personalizing communication between origination devices and destination devices based on intelligent information searches and retrievals of historical interaction data on networks includes a user module adapted to displaying information to the origination device for identifying individuals or groups of individuals and historical interaction data. The system includes a processing module adapted to query a server system in response to commands from a user of the origination device. The query requests historical interaction data relating to the individual or group of individuals and can identify the individual or group using the historical interaction data from the server system. An information receipt and display module displays historical interaction data received from the server system, including the specifically requested historical interaction data. A communication module connects the origination device to the destination device using the information data from the server system.

16 Claims, 1 Drawing Sheet

PERSONALIZED DIRECTORY SERVICES FOR WEB ROUTING

FIELD

The present embodiments relate to systems that act as an intelligent interactive information search and retrieval engine for a user and for providing and personalizing communication between an origination device and a destination device based on historical interaction data from a communications network system.

BACKGROUND

Recent advancements in network telephony applications have created a plurality of possibilities for enhancements to services involving data connections and forms of data that can be carried over communication links. Web-based communication applications make it possible for users to access websites, click on a link, and establish a voice over an internet-protocol telephone call from the user's phone or computer to a recipient's phone or computer. Currently, by enabling a web-based telephony application to receive URL's, a user now has the option to make a web-based telephony call to another telephone number or to a skill set, by specifying the phone number in a URL containing specified information. For example, this information can be time information for automatically initiating a telephone call, or for feature keys on a user's telephone terminal to be programmed so that, when activated at a particular time, a specific call is initiated.

Traditionally, terminals for transmitting and receiving the calls have decided the nature of the proposed communication connection and whether to establish a circuit-switched connection or packet-switched connection for carrying the data during the communication. Packet-switched connections are a relatively new advancement and allow data of more than one form to be carried over a communications link, such as voice and video data being carried on a communications link simultaneously.

Accordingly, users are now able to connect to networks or web-routing services through telephony applications to initiate calls, manually or automatically, and to acquire information from the network that is relevant to the user's call or needed in the user's communication.

Network channels and availability for information searches that can be performed in real-time by a user and that can provide contact information relevant to the user's call are an important aspect that is needed. In addition, current users must perform information searches each time the information changes or is required.

A need exists for a way to collect or cache into a data store all previous information interactions that a user has exchanged through network using either conventional telephones or web-based telephones.

A need exists for an ability to communicate information between a point of origination to a point of destination by input from a user in such forms as typed-text, voice, and combinations thereof and to produce this information for communication by user-initiated queries using keywords, elaborated natural language, etc., in a manner such that the information can be uniquely associated to a user by transactions, account numbers, tickets, or other user-selected attributes.

The present embodiments address these needs.

SUMMARY

The present embodiments relate to systems for personalizing communication on a network between an origination device and a destination device based on user requested intelligent, information searches and retrievals of historical interaction data performed using a network system.

The present systems includes a user module adapted for displaying information to an origination device (e.g., such as a cell phone, computer, conventional or satellite telephone, personal digital assistant, or combinations thereof) for identifying individuals or groups of individuals and historical interaction data provided by individuals or groups, such as telephone numbers, addresses, web and IP addresses, and combinations of these and others.

A processing module can be adapted to query a server system in response to input commands from a user of the origination device about an individual or group of individuals. The query can request historical interaction data relating to the individual or group of individuals and can identify the individual or group by using the historical interaction data that has been received and stored on the server system.

An information receipt and display module can display historical interaction data received from the server system, including the historical interaction data specifically requested by the user of the origination device. A communication module can connect the origination device to the destination device by using the requested and personalized information received from the server system.

BRIEF DESCRIPTION OF THE DRAWINGS

The embodiments are illustrated by way of example and not limitation in the figures of the accompanying drawings in which like references indicate similar elements.

DETAILED DESCRIPTION OF THE EMBODIMENTS

Figure 1:
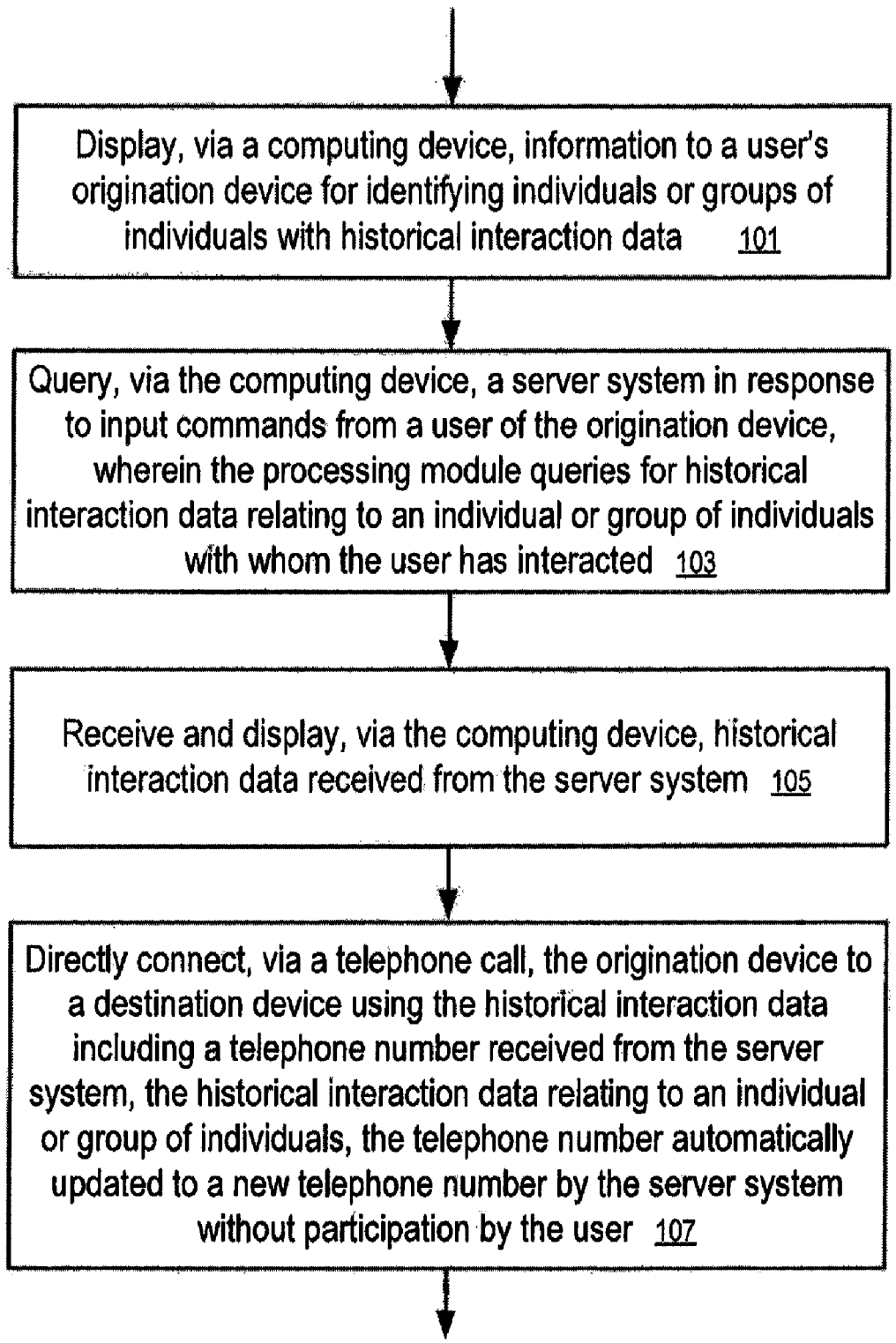
FIG. 1 shows a method to establish a communication connection according to one embodiment.

Before explaining the present embodiments in detail, it is to be understood that the embodiments are not limited to the particular descriptions and that they can be practiced or carried out in various ways.

The present embodiments relate to systems for acting as an intelligent interactive information search and retrieval engine to personalize communication on a network between an origination device and a destination device. The systems can use historical interaction data, or user preferences, relating to an individual or group of individuals, which can be stored on a data store and uniquely associated to a user by user selected attributes.

The present embodiments provide an efficient system for information searches or browsing that can be personalized to a user, saving time and costs, and can create an improvement to the overall user's experience regarding searches and retrievals of contact information.

The present embodiments provide systematic approaches to personalizing communication over web-based, internet, and other networks. The present embodiments allow a user to request and retrieve contact information relating to individuals or groups of individuals through information network searches; a question and answering network system; or any other intelligent, interaction information network system. While interacting with this automated system through an information search or any input network query, the user can have the option of interacting with a human agent in response to a document relevant to the query through capabilities, such as click-to-talk features. After the user has performed an input query, the information from the query can be stored on a data store in a server system. The information can be updated, automatically or as needed, and can be enriched with additional user attributes. Examples of additional user attributes include associations to specific account numbers, association to user transactions, or accessed by a user for communication to another.

The present systems establish a communication connection between an origination device and a destination device, in which the origination and designation devices can be a cell phone, a conventional telephone, a voice over IP phone, a satellite phone, a personal digital assistant, a computer, an internet access terminal, or combinations thereof. The computer can act as a soft phone, that is the computer can provide telephony services to a communication network.

The present embodiments include a user module adapted for displaying information to an origination device for identifying individuals or groups of individuals as requested by a user. The user module can access historical interaction data, or user preferences, such as cached telephone calls recordings, telephone numbers, company names, addresses, telephone exchanges, web addresses, internet protocol addresses, data input by third parties concerning individuals or groups of individuals, and combinations thereof to perform the identification of the individuals or groups. The user module can be adapted to allow a user to browse or search historical interactive data by individual names or group names as related to the specific information needed by the user and to invoke the sending of the information to the user from the browser.

The present embodiments include a processing module adapted to query a server system in response to input commands from a user of the origination device. The user-initiated query can request historical interaction data relating to the individuals or group of individuals and can indicate an identifier of the individuals or groups, whose historical interaction data is being requested from a server system.

The identifier is a unique code established for the individual or groups of individuals. The user can initiate a query for contact information related to these individuals or groups using: keywords from a call, the names of individuals or groups, elaborate natural language, or combinations of these or others from categories of historical interaction data which can include user preferences.

The present embodiments permit a query to be performed on a server system. The server system can include a content delivery module, a historical interaction data module, and/or an association processing module. The content delivery module is adapted to return individual or groups of individual's content to a client system or user of an origination device.

The historical interaction data module can query the receiver, data store, and/or aid in historical interaction data retriever interactions. The historical interaction data module can be housed in the server system. The historical interaction data module can include a data storage medium for storing historical information corresponding to individuals or groups of individuals, such as individuals or groups of individuals who have accessed directly the historical interactive data. The data storage medium of the historical interactive data module can store attributes of the historical interaction data within one or more categories. Examples of a category include a call record, a call duration, a name of another individual in the groups of individuals and combinations thereof.

The historical interaction data retrieval module can function to retrieve historical interaction data requested in the queries from the data storage medium for an individual or group of individuals, whose historical interaction data is being accessed. The historical interaction data retrieval module can provide a telephone number from the queried data to the user module to be sent to the user of the origination device. The historical interaction data retrieval module can be used to access user preferences.

Examples of historical interaction data that can be queried and accessed includes telephone numbers, call records, addresses, web addresses, IP addresses, data provided by individuals or groups of individuals, data provided by third parties concerning the individuals or groups of individuals, and combinations thereof. Any additional information received from a third party can be stored using the historical interaction data module. Additional information can include caller information or callee information. Example of additional information include dates of telephone calls, times of telephone calls, call duration, telephone numbers, caller addresses, callee addresses, names of callers, names of callees, unique call identifiers, another field of data, or combinations thereof.

The association module can include a selection module adapted to allow individuals or groups of individuals to choose the individual or groups of individuals. The individuals are then associated and are allowed to communicate with the chosen individual or groups of individuals through the server system. The association module can include a remove/edit module adapted to allowing individuals or groups of individuals to delete the association or modify the association and to communicate this deletion or modification to the server system.

The present embodiments can include an information receipt and display module adapted to display the historical interaction data and/or user preferences received from the server system, including requested historical interaction data by the user of an origination device.

The present embodiments can include a communication module that connects the origination device to a destination device using the contact information requesting by the user and relating to individuals or groups received from the server system. The user of the origination device can communicate to a destination device using such forms of communication as typed text, voice, video, or combinations thereof.

The user module permits a user to browse or search historical interactive data or user preferences by individual names or groups of names.

The following is an example of how the embodied system can be used for personalizing communication on a network between an origination device and a destination device based on user initiated information searches and retrievals of historical interaction data:

An attorney at a law firm in Houston, Tex., uses her cell phone to communicate a text message to an attorney at a law firm in New Jersey regarding a client's case. The Houston attorney realizes that she is lacking contact information for the New Jersey attorney. The Houston attorney had performed an Internet™ search to obtain the New Jersey attorney's law firm telephone number and address several months ago. The Houston attorney now uses her cell phone to signal an AT&T™ network provider using touch tone features in order to connect to an Internet browser to request for an information search by the attorney's law firm name. A search of stored historical interaction data acquired from previous use by the Houston law office identifies the New Jersey attorney and sends the contact information to the Houston attorney as a display to the Houston attorney's cell phone. The Houston attorney notices that this is a new number for the New Jersey attorney, which was recently updated automatically by the AT&T™ network system. The Houston attorney uses this information to connect successfully to the New Jersey attorney.

FIG. 1 shows a method for establishing a communication connection according to one embodiment. A computing device displays (101) information to a user's origination device for identifying individuals or groups of individuals with historical interaction data. The computing device queries (103) a server system in response to input commands from a user of the origination device, wherein the processing module queries for historical interaction data relating to an individual or group of individuals with whom the user has interacted. The computing device receives and displays (105) historical interaction data received from the server system. Via a telephone call, the origination device is directly connected (107) to a destination device using the historical interaction data including a telephone number received from the server system, the historical interaction data relating to an individual or group of individuals, the telephone number automatically updated to a new telephone number by the server system without participation by the user.

While these embodiments have been described with emphasis on the embodiments, it should be understood that within the scope of the appended claims, the embodiments might be practiced other than as specifically described herein.

What is claimed is:

1. A computer system for establishing a communication connection between an origination device and a destination device based on historical interaction data, the computer system comprising:
the origination device having stored in a storage medium:
a user module to display information to a user's origination device for identifying one of individuals and groups of individuals with the historical interaction data;
a processing module to query a server system of a separate communication network provider in response to input commands from a user of the origination device, wherein the processing module performs a contact information query for the historical interaction data relating to one of a first individual and a first group of individuals with whom the user has interacted, wherein the processing module queries the server system using a unique code identifier of one of the first individual and the first group of individuals whose historical interaction data is being requested from the server system, wherein contact information within the historical interaction data was previously provided to the user in response to a previous Internet search query;
an information receipt and display module to receive and display the historical interaction data received from the server system; and
a communication module that directly connects, via a telephone call, the origination device to the destination device using the historical interaction data including a telephone number received from the server system, the historical interaction data relating to one of an individual and a group of individuals, the telephone number automatically being updated to a new telephone number by the server system of the separate communication network provider without participation by the user.

2. The computer system of claim 1, wherein the identifier is a unique code for one of the first individual and the first group of individuals.

3. The computer system of claim 1, wherein the origination device is one of a cell phone, a voice over IP phone, a conventional telephone, a satellite phone, a personal digital assistant, a computer, an internet access terminal, and combinations thereof.

4. The computer system of claim 1, wherein the destination device is one of a cell phone, a voice over IP phone, a conventional telephone, a satellite phone, a personal digital assistant, a computer, an internet access terminal, and combinations thereof.

5. The computer system of claim 1, wherein the server system further comprises:
a content delivery module returning one of an individual's content and groups of individuals' content to the user module; and
a historical interaction data module comprising:
a data storage medium for storing information corresponding to one of the individual's content and groups of individuals' content;
a receiving module to receive queries for the historical interaction data; and
a historical interaction data retrieval module for retrieving the historical interaction data requested in the queries from the data storage medium for one of an individual and a group of individuals whose historical interaction data is being accessed, wherein the historical interaction data retrieval module provides a telephone number from the historical interaction data to the user module.

6. The computer system of claim 5, wherein the server system comprises a remove/edit module allowing one of the individuals and the groups of individuals to one of remove and edit historical interaction data.

7. The computer system of claim 5, wherein additional information received from a third party is stored with the historical interaction data.

8. The computer system of claim 7, wherein the additional information is one of a telephone call date, a telephone call time, call duration, a telephone number, a caller address, a callee address, a caller's name, a callee's name, a unique call identifier, and combinations thereof.

9. The computer system of claim 5, wherein the data storage medium retains historical information about one of the individuals and the groups of individuals who have accessed the historical interaction data.

10. The computer system of claim 5, wherein the data storage medium of the historical interaction data module stores attributes of the historical interaction data within at least one category.

11. The computer system of claim 10, wherein the at least one category is one of a call record, a call duration, a name of another individual in the groups of individuals, and combinations thereof.

12. The computer system of claim 5, wherein the historical interaction data module operates independently of other modules of the server system.

13. The computer system of claim 1, wherein the user module allows the user to browse the historical interaction data by one of individual names and group names.

14. The computer system of claim 1, wherein the user module allows the user to search historical interaction data by one of individual names and group names.

15. The computer system of claim 1, wherein the historical interaction data is one of cached telephone call recordings, telephone numbers, company names, addresses, telephone exchanges, web addresses, internet protocol addresses, data input concerning individuals or groups of individuals, other information derivable from a call record, and combinations thereof.

16. A computer implemented method for establishing a communication connection between an origination device and a destination device based on historical interaction data comprising:

displaying, via a computing device, information to a user's origination device for identifying one of individuals and groups of individuals with historical interaction data;

querying, via the computing device, a server system of a separate communication network provider for contact information in response to input commands from a user of the origination device, wherein the processing module queries for historical interaction data relating to one of an individual and a group of individuals with whom the user has interacted, wherein the processing module queries the server system using a unique code identifier of one of the first individual and the first group of individuals whose historical interaction data is being requested from the server system, wherein contact information within the historical interaction data was previously provided to the user in response to a previous Internet search query;

receiving and displaying, via the computing device, historical interaction data received from the server system; and directly connecting, via a telephone call, the origination device to a destination device using the historical interaction data including a telephone number received from the server system, wherein the historical interaction data relates to one of an individual and a group of individuals, and the telephone number is automatically updated to a new telephone number by the server system of the separate communication network provider without participation by the user.

* * * * *